3,432,430
CLARIFICATION OF AQUEOUS SYSTEMS
Winifred Jane Levy, Northwich, and John Prescott Newport and Reginald John William Reynolds, Runcorn, England, assignors to Imperial Chemical Industries Limited, London, England, a corporation of Great Britain
No Drawing. Filed Feb. 23, 1966, Ser. No. 529,227
Claims priority, application Great Britain, Mar. 11, 1965, 10,378/65
U.S. Cl. 210—51   10 Claims
Int. Cl. B01d 21/22; C02b 1/20

ABSTRACT OF THE DISCLOSURE

Turbidity and color are removed from raw water and other aqueous systems such as sewage by adding very small amounts, for example 1–5 parts per million, of partially quaternised homopolymers of vinyl esters of α-halogenated aliphatic carboxylic acids, or copolymers of vinyl esters of α-halogenated aliphatic carboxylic acids and other polymerisable monomers in which some of the α-halocarboxylate groups are quaternised. It is not necessary to add inorganic flocculating agents to assist the organic compounds. The preferred ester is vinylchloroacetate and the preferred quaternising agent is pyridine and the degree of quaternisation is generally less than about 60% and preferably 10–30% in the products suitable for treating water and 30–60% in those for treating sewage. Other quaternising agents include triethylamine, bipyridyl and thiourea, and vinyl acetate is suitable for copolymerising with vinyl chloroacetate.

---

This invention relates to the clarification of raw water and other aqueous systems by the flocculation and subsequent settling of suspended matter and the removal of colour.

It is known to remove turbidity and colour from raw water by adding certain inorganic salts that yield precipitates of metal hydroxides in the form of flocs, for example aluminium sulphate and ferric chloride. By this means the suspended matter responsible for turbidity and colour is enveloped by the flocs as they grow, and after subsequent filtration or sedimentation to remove the solid phases the resulting water is clear and colourless. To obtain good results this type of treatment must be carried out over a fairly narrow pH range, dependent on the salt, and the amount added of the latter must be carefully controlled if poor floc formation is to be avoided. Even under the best conditions the settling rate of flocs is slow, and to increase the rate flocculating aids, for example activated silica and polyelectrolytes, may be added. These increase the rate of growth of flocs and also their size.

In practice the amount of inorganic salt added is such that large amounts of sludge are formed, composed of flocs and the suspended matter enveloped thereby. The sludge is bulky and difficult to dewater and its disposal presents a major problem at waterworks.

To avoid the formation of large quantities of sludge it has been proposed to use polyelectrolytes in place of the metal salts. Anionic polyelectrolytes are known to be effective in bringing about the settling of suspended matter, but in general even the most efficient leave behind a residual turbidity, and they are consequently of no value for clarifying a raw water where the initial turbidity is quite low. Cationic polyelectrolytes are known to remove turbidity in some raw waters but do not remove colour, and unless the water contains a considerable amount of suspended matter the rate of settling of the particles flocculated by the polyelectrolyte is slow.

We have now discovered a group of cationic polyelectrolytes that not only remove turbidity from raw water by themselves, that is to say without the need for inorganic flocculating agents such as aluminium sulphate, but also remove colour. They are also effective in other aqueous systems for example for flocculating sewage. They comprise partially quaternised homopolymers of vinyl esters of α-halogenated aliphatic carboxylic acids, and copolymers of these esters with other polymerisable monomers for example vinyl acetate, methyl methacrylate, styrene, in which some of the α-halocarboxylate groups are quaternised.

Thus according to our invention we provide a process for clarifying and decolorising aqueous systems containing suspended particles comprising treating the system with a cationic polyelectrolyte that is a partially quaternised homopolymer of a vinyl ester of an α-halogenated aliphatic carboxylic acid, or a copolymer of a vinyl ester of an α-halogenated aliphatic carboxylic acid and another polymerisable monomer in which some of the α-halocarboxylate groups are quaternised.

Examples of quaternising compounds include pyridine, bipyridyls, triethylamine and thiourea, of which pyridine is preferred. More than one compound can be used in the same quaternising process.

The terms quaternised and quaternising have their usual organochemical meanings namely that the quaternising compound adds on to the other compound through a nitrogen atom of the quaternising compound, the valency of the nitrogen atom changing thereby from three (covalencies) to five (four covalencies and one electrovalency). For the chloroacetate group for example this can be represented by the scheme

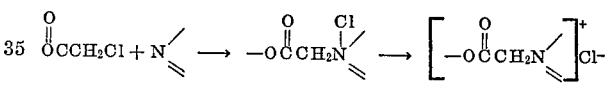

It is essential that the quaternisation be only partial if the polyelectrolyte is to be effective; we have found completely quaternised polymers to be inactive. In this specification a degree of quaternisation of y% is defined as meaning that y% of the halocarboxylate groups in a vinyl α-halocarboxylate homopolymer or copolymer are quaternised.

The halogen in the α-halogenated aliphatic carboxylic acid may in particular be chlorine though other halogens, for example bromine, through which the quaternisation reaction can proceed are admissible. The essential feature of the polyelectrolytes of the invention resides, we believe, more in the partial quaternisation than in the particular halogen or carboxylic acid involved. Particularly useful homopolymers and copolymers are those of vinyl chloroacetate and vinyl chloroacetate/vinyl acetate respectively. In the polymers suitable for treating water the degree of quaternisation is generally less than 50% and preferably from 10% to 30%. For example polyvinyl chloroacetates 15% to 20% quaternised with pyridine are particularly effective, the unquaternised polyvinyl chloroacetates being such as have intrinsic viscosities in methyl ethyl ketone at 25° C. of the order of 0.10. For treating sewage polymers and copolymers of higher molecular weight are preferable and it is necessary to quaternise these to a greater degree in order that after quaternisation they may be sufficiently active. For example in treating sewage with partially quaternised polyvinyl chloroacetates those that are 30% to 60% quaternised are preferable, the unquaternised polyvinyl chloroacetates being such as have intrinsic viscosities in methyl ethyl ketone at 25° C. of about 0.30 to 0.90. Polymers having even higher molecular weights, and higher degrees of quaternisation than 60% may be used.

Not only do the partially quaternised homopolymers and copolymers of the invention remove turbidity and colour by themselves but they do so over a wide pH range, namely from 3.0 to 11.0, and at very small concentrations. For example from one to two parts of them per million parts of water by weight is as effective as 30 parts per million of aluminium sulphate. Thus by using them instead of aluminium sulphate and similar inorganic floc-forming salts the amount of sludge that is formed in the treatment of the raw water or other aqueous systems is much reduced.

If the partially quaternised homopolymers and copolymers are used in conjunction with chlorine, for example if chlorine is present beforehand in the water from a sterilisation treatment, rapid growth of flocs occurs and the rate of settling is comparable with that normally achieved with a combination of aluminium sulphate and an anionic polyelectrolyte such as a polyacrylate.

The invention is illustrated by experiments whose results are given in the tables and in Examples 1–4. In each experiment summarised in the tables the polyelectrolyte or other substance was added to 800 mls. of raw water contained in a beaker and the system stirred rapidly (420 r.p.m.) for 8 minutes and slowly (20 r.p.m.) for 12 minutes. Floc size was estimated visually at intervals during the slow stirring. Samples were removed from the top half of the system after stirring had been stopped for 10 minutes and their optical densities determined in an absorptiometer. The experiments described in Examples 1–3 relate to clarifying units having a through-flow of 6 gallons per hour. Example 4 describes treatment of a digested sewage sludge. The treatment is also applicable to primary and activated sewage sludges. Intrinsic viscosities of the unquaternised polyvinyl chloroacetates refer to measurements at 25° C. in methyl ethyl ketone solution.

TABLE 1

The experiments summarised in this table show the effect of different degrees of quaternisation of polyvinyl chloroacetate with pyridine in comparison with a control (Experiment No. 1) in which nothing was added to the water, and with the effect of an addition of aluminium sulphate alone (Experiment No. 2). The amount of aluminium sulphate added was 30 parts per million parts of water by weight, and of the quaternised polyvinyl chloroacetate 3 parts per million parts of water by weight. In Experiments 3–12 the intrinsic viscosity of the unquaternised polyvinyl chloroacetate was 0.10; in Experiments 13–17 it was 0.90.

| Expt. | Percent quaternisation | Floc size after 5 min., mm. | Optical density (units) after— | |
|---|---|---|---|---|
| | | | 10 min. settling | Filtration |
| 1 | | 0 | 21.2 | 10.6 |
| 2 | | 1.0 | 15.0 | 4.0 |
| 3 | 8.5 | 0.75 | 17.5 | 6.0 |
| 4 | 11.5 | 0.75 | 15.0 | 4.2 |
| 5 | 15.5 | 1.0 | 21.2 | 3.8 |
| 6 | 27.0 | 1.0 | 25.0 | 4.4 |
| 7 | 32.0 | 1.0 | 22.0 | 6.2 |
| 8 | 40.5 | 1.0 | 25.0 | 16.0 |
| 9 | 42.5 | 1.0 | 21.0 | 16.2 |
| 10 | 55.5 | 0 | 19.0 | 13.5 |
| 11 | 56.0 | 0 | 27.0 | 15.2 |
| 12 | 59.0 | 0 | 26.0 | 15.6 |
| 13 | 10.0 | (¹) | | |
| 14 | 20.0 | 0.75 | 18.0 | 9.0 |
| 15 | 30.0 | 1.5 | 24.0 | 4.8 |
| 16 | 40.0 | 1.5 | 33.8 | 23.0 |
| 17 | 60.0 | 0 | | |

¹ Polymer insoluble.

The results show that polyvinyl chloroacetates partially quaternised with pyridine are most effective when the degree of quaternisation is from about 10% to about 30%.

TABLE 2

The experiments summarised in this table show the effect of the presence in the water of 5 parts of chlorine per million parts of water by weight on the behaviour of the same series of polyvinyl chloroacetates partially quaternised with pyridine as used in Experiments 3–12 of Table 1. Experiment No. 1 is a control with no addition to the water except the chlorine, No. 2 refers to aluminium sulphate (30 p.p.m.) and chlorine, and No. 3 to aluminium sulphate (30 p.p.m.) plus 0.25 p.p.m. of an anionic polyelectrolyte in absence of chlorine.

| Expt. | Percent quaternisation | Floc size after 5 min., mm. | Optical density (units) after— | |
|---|---|---|---|---|
| | | | 10 min. settling | Filtration |
| 1 | | 0 | 21.2 | 10.6 |
| 2 | | 1.5 | 10.5 | 3.5 |
| 3 | | 3.0 | 4.8 | 3.0 |
| 4 | 8.5 | 1.0 | 11.8 | 2.5 |
| 5 | 11.5 | 1.5 | 5.2 | 1.1 |
| 6 | 15.5 | 1.5 | 4.5 | 0.8 |
| 7 | 27.0 | 1.5 | 4.5 | 0.6 |
| 8 | 32.0 | 1.0 | 13.8 | 4.8 |
| 9 | 40.5 | 1.0 | 13.6 | 4.5 |
| 10 | 42.5 | 1.0 | 14.0 | 5.8 |
| 11 | 55.5 | 0.75 | 14.4 | 5.2 |
| 12 | 56.0 | 0.75 | 13.8 | 6.4 |
| 13 | 59.0 | 0.75 | 14.2 | 6.8 |

The results show how in the presence of chlorine the rate of settling of flocs is comparable with that achieved with aluminium sulphate plus an anionic polyelectrolyte for degrees of quaternisation of approximately 10% to 30%.

TABLE 3

The three experiments summarised in this table relate to polyvinyl chloroacetates partially quaternised with pyridine in which the intrinsic viscosity of the unquaternised polyvinyl chloroacetate was 0.90%. The amount of partially quaternised polymer added to the water was 3 parts per million parts of water by weight, and the water contained 5 parts of chlorine per million by weight. The results show that with the polymers of higher molecular weight a greater degree of quaternisation, namely about 30% is necessary.

| Expt. | Percent quaternisation | Floc size after 5 min., mm. | Optical density (units) after— | |
|---|---|---|---|---|
| | | | 10 min. settling | Filtration |
| 1 | 20.0 | 0.75 | 25.0 | 10.8 |
| 2 | 30.0 | 1.5 | 7.0 | 0.4 |
| 3 | 40 | 1.5 | 32.0 | 12.4 |

TABLE 4

The experiments summarised in this table show the effect of partially quaternising polyvinyl chloroacetate having an intrinsic viscosity of 0.10 with mixtures of pyridine and 4,4'-bipyridyl. The degree of quaternisation as a whole was about 25% and the percentage of bipyridyl in the polymer as a whole ranged fom 0 to 1.5 as shown. By p.p.m. is meant parts by weight per million parts by weight of water.

| Bipyridyl, percent | Polymer in water, p.p.m. | Chlorine in water, p.p.m. | Floc size after 5 min., mm. | Optical density (units) after— | |
|---|---|---|---|---|---|
| | | | | 10 min. settling | Filtration |
| 0 | 1 | 0 | 0.75 | 22.2 | 6.0 |
| 0 | 1 | 5 | 1.0 | 18.0 | 5.0 |
| 0 | 2 | 0 | 1.0 | 12.5 | 2.5 |
| 0 | 2 | 5 | 1.5 | 4.0 | 0 |
| 0.29 | 1 | 0 | 1.0 | 15.0 | 4.0 |
| 0.29 | 2 | 0 | 1.0 | 15.0 | 3.0 |
| 0.52 | 1 | 0 | 0.75 | 22.0 | 5.0 |
| 0.52 | 2 | 0 | 1.0 | 16.0 | 5.0 |
| 0.80 | 1 | 0 | 0.75 | 28.0 | 12.0 |
| 1.50 | 0.25 | 0 | 1.0–3.0 | 17.0 | 6.0 |

TABLE 5

The experiments summarised in this table show the effect of polyvinyl chloroacetates 15.5% quaternised with pyridine, 18.6% quaternised with triethylamine and 18.1% quaternised with thiourea. Table 6 shows results obtained with an identical series of experiments in water containing 5 parts by weight of chlorine per million parts of water. The unquaternised polyvinyl chloroacetates all had intrinsic viscosities of 0.10.

| Quaternising compound | Polymer in water, p.p.m. | Floc size after 5 min., mm. | Optical density (units) after— | |
|---|---|---|---|---|
| | | | 10 min. settling | Filtration |
| Pyridine | 1 | 0.5 | 17.8 | 4.8 |
| Do | 3 | 1.0 | 21.2 | 3.8 |
| Do | 5 | 1.5 | 17.5 | 2.8 |
| Triethylamine | 1 | 0 | 16.5 | 12.5 |
| Do | 3 | 0.75 | 19.5 | 5.0 |
| Do | 5 | 1.0 | 20.0 | 4.0 |
| Thiourea | 1 | 0 | 16.0 | 14.5 |
| Do | 3 | 0 | 18.5 | 14.0 |
| Do | 5 | 0.75 | 21.5 | 14.0 |

TABLE 6

Experiments as in Table 5 but in water containing 5 parts by weight of chlorine per million of water.

| Quaternising compound | Polymer in water, p.p.m. | Floc size after 5 min., mm. | Optical density (units) after— | |
|---|---|---|---|---|
| | | | 10 min. settling | Filtration |
| Pyridine | 1 | 0.5 | 13.0 | 11.5 |
| Do | 3 | 2.25 | 5.0 | 1.2 |
| Do | 5 | 3.0 | 3.5 | 0.9 |
| Triethylamine | 1 | 0.5 | 14.0 | 9.0 |
| Do | 3 | 0.75 | 14.5 | 6.0 |
| Do | 5 | 1.0 | 14.0 | 0.8 |
| Thiourea | 1 | 0 | 14.5 | 10.5 |
| Do | 3 | 0 | 15.0 | 11.5 |
| Do | 5 | 0.75 | 17.0 | 9.0 |

TABLE 7

Experiments 4–9 summarised in this table relate to quaternised copolymers of vinyl chloroacetate and vinyl acetate, whilst Experiments 1–3 are for comparison, No. 1 relating to no addition of polymer and Nos. 2 and 3 to addition of a polyvinyl chloroacetate homopolymer 15.5% quaternised with pyridine. The copolymers are designated A, B, C, and were made up as shown below.

| Copolymer | Percent vinyl chloroacetate | Percent vinyl acetate | Percent quaternisation of vinyl chloroacetate |
|---|---|---|---|
| A | 64 | 36 | 75.7 |
| B | 66 | 34 | 29.2 |
| C | 34 | 66 | 43.6 |

| Expt. and copolymer | Polymer or copolymer in water, p.p.m. | Floc size after 5 min., mm. | Optical density (units) after— | |
|---|---|---|---|---|
| | | | 10 min. settling | Filtration |
| 1 | 0 | 0 | 15.5–18.0 | 12.5–14.8 |
| 2 | 2 | 0.5 | 20.8 | 5.0 |
| 3 | 5 | 1.5 | 17.5 | 2.8 |
| 4A | 2 | 0.75 | 20.0 | 6.2 |
| 5A | 5 | 1.0 | 23.5 | 4.2 |
| 6B | 2 | 0 | 18.0 | 4.2 |
| 7B | 5 | 1.0 | 19.0 | 1.5 |
| 8C | 2 | 0 | 21.0 | 14.5 |
| 9C | 5 | 0.75 | 32.0 | 18.0 |

TABLE 8

Experiments 4–9 summarised in this table relate to the same quaternised copolymers, and Experiments 1–3 to the same comparisons, as those used in the experiments of Table 7 and were carried out in the same way, the only difference being that 5 parts by weight of chlorine per million parts by weight of water were present in the experiments of Table 8.

| Expt. and copolymer | Polymer or copolymer in water p.p.m. | Floc size after 5 min., mm. | Optical density (units) after— | |
|---|---|---|---|---|
| | | | 10 min. settling | Filtration |
| 1 | 0 | 0 | 13.2–15.0 | 11.0–12.5 |
| 2 | 2 | 1.5 | 8.0 | 1.2 |
| 3 | 5 | 3.0 | 3.5 | 0.9 |
| 4A | 2 | 0 | 16.0 | 12.0 |
| 5A | 5 | 0.75 | 19.0 | 13.5 |
| 6B | 2 | 0.50 | 14.0 | 6.5 |
| 7B | 5 | 1.5 | 6.0 | 0.4 |
| 8C | 2 | 0 | 15.0 | 10.5 |
| 9C | 5 | 0.75 | 19.5 | 8.5 |

Tables 7 and 8 show that copolymer A was of similar activity to the homopolymer though the addition of chlorine had a deleterious rather than a beneficial effect. Copolymer B was substantially equivalent to the homopolymer but copolymer C was inactive.

The raw water used in all the experiments summarised in tables contained, expressed in parts by weight per million parts by weight of water, calcium compounds equivalent to 179 of $CaCO_3$, and magnesium compounds equivalent to 66 of $MgCO_3$; 33 of chloride, 116 of sulphate and 122 of carbonate ions; and 0.5 of iron. It had a pH of 7.6 and the optical density measured in the same units as those used in the tables varied from 15 to 18 units of which colour was responsible for 8 to 11 units.

EXAMPLE 1

A clarification unit having a through-flow of 6 gallons per hour and comprising mixing and flocculating vessels, and a sand filter was used. The raw water feed had a turbidity equivalent to that produced in clear water by 26 parts per million of bentonite by weight and a colour intensity of 43 Hazen units. Addition by flash mixing of 3 parts per million by weight of a polyvinyl chloroacetate of intrinsic viscosity 0.1 and 17.5% quaternised with pyridine followed by flocculation and passage through the sand filter gave an exit water having a turbidity equivalent to 1 part per million of bentonite by weight and a colour of 7 Hazen units. The experiment ran for 38½ hours by which time the pressure in the filter had reached 25 lb./sq. inch.

EXAMPLE 2

In an experiment similar to that described in Example 1, 2 parts per million by weight of the same partially quaternised polyvinyl chloroacetate and 5 parts per million by weight of chlorine were added to the water. This treatment reduced the turbidity from the equivalent of 8 to 0.30 parts per million of bentonite by weight and the colour from 37 to 3 Hazen units. The experiment ceased after 53 hours when the pressure in the filter had reached 27 lb./sq. inch. When 5 parts per million of chlorine was added to the water in the absence of polyelectrolyte the turbidity was reduced only to the equivalent of 7 parts per million of bentonite and the colour to 30 Hazen units.

EXAMPLE 3

The same clarification unit as in Examples 1 and 2 was used but the water after flash mixing with the polyelectrolyte was passed directly to the sand filter without passing through the flocculating stage. An addition of 3 parts per million by weight of the polyelectrolyte reduced the turbidity from the equivalent of 46 to 4 parts per million by weight of bentonite, and the colour from 46 to 8 Hazen units. The experiment ended after 8 hours when the pressure in the filter had reached 25 lb./sq. inch.

EXAMPLE 4

A sample of digested sewage sludge containing 2.15% solids by weight was treated with an amount of a polyvinyl chloroacetate 40% quaternised with pyridine equivalent to 0.80% by weight of the weight of solids and then filtered. The unquaternised polyvinyl chloroacetate had an intrinsic viscosity of 0.90. The rate of filtration was approximately ten times that of a sample of the untreated sludge and about the same as the filtration rate of the sludge treated with 40% of ferric chloride by weight of the solids.

What we claim is:

1. A process for clarifying and decolorising aqueous systems containing suspended particles comprising adding to the system a cationic polyelectrolyte that is a partially quaternised polymer selected from partially quaternised homopolymers of vinyl chloroacetate and partially quaternised copolymers of vinyl chloroacetate and vinyl acetate, the degree of quaternisation not exceeding 60%.

2. A process as claimed in claim 1 in which the quaternising agent is thiourea.

3. A process as claimed in claim 1 in which chlorine is also present in the water.

4. A process as claimed in 1 in which the quaternising agent comprises at least one tertiary amine.

5. A process as claimed in claim 4 in which the quaternising agent comprises at least one tertiary amine selected from pyridine, bipyridyls and triethylamine.

6. A process as claimed in claim 5 in which the tertiary amine is pyridine and the degree of quaternisation is 10% to 30%.

7. A process as claimed in claim 5 wherein the aqueous system comprises sewage and the tertiary amine is pyridine and the degree of quaternisation is 30% to 60%.

8. A process as claimed in claim 5 in which the quaternising agent comprises both pyridine and a bipyridyl.

9. A process for clarifying and decolorising aqueous systems containing suspended particles comprising adding to the system a cationic polyelectrolyte that is a partially quaternised polymer selected from partially quaternised homopolymers of vinyl choroacetate and partially quaternised copolymers of vinyl chloroacetate and vinyl acetate, the degree of quaternisation being between 10% and 60% and the quaternising agent being selected from pyridine, 4,4'-bipyridyl, triethylamine and thiourea.

10. A process according to claim 9 wherein the aqueous system is selected from raw water and water containing sewage and the degree of quaternisation is 10% to 30% and 30% to 60%, respectively.

References Cited

FOREIGN PATENTS 662,534 5/1963 Canada.

MICHAEL E. ROGERS, *Primary Examiner.*

U.S. Cl. X.R.

210—54; 260—85.7, 89.1